US011778152B2

(12) United States Patent
Tomotoshi

(10) Patent No.: US 11,778,152 B2
(45) Date of Patent: Oct. 3, 2023

(54) METHOD OF CONTROLLING PROJECTOR AND PROJECTOR

(71) Applicant: SEIKO EPSON CORPORATION, Tokyo (JP)

(72) Inventor: Akio Tomotoshi, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/872,414

(22) Filed: Jul. 25, 2022

(65) Prior Publication Data
US 2023/0025629 A1 Jan. 26, 2023

(30) Foreign Application Priority Data

Jul. 26, 2021 (JP) ................................. 2021-121304

(51) Int. Cl.
*H04N 9/31* (2006.01)
*G06F 3/0354* (2013.01)
*G06F 3/042* (2006.01)

(52) U.S. Cl.
CPC ....... *H04N 9/3182* (2013.01); *G06F 3/03542* (2013.01); *G06F 3/0425* (2013.01)

(58) Field of Classification Search
CPC .. H04N 9/3179; H04N 9/3182; H04N 9/3194; G06F 3/0386; G06F 3/0425; G06F 3/03542; G06F 2203/0381
See application file for complete search history.

(56) References Cited

U.S. PATENT DOCUMENTS

| 8,449,122 B2 * | 5/2013 | Luo | H04N 9/3194 345/157 |
| 8,648,964 B2 * | 2/2014 | Ishibashi | G06F 3/1446 348/383 |
| 9,426,436 B2 * | 8/2016 | Nakashin | H04N 9/3194 |
| 9,503,711 B2 * | 11/2016 | Iversen | H04N 9/3158 |
| 9,519,379 B2 * | 12/2016 | Ichieda | G09G 3/02 |

(Continued)

FOREIGN PATENT DOCUMENTS

CN 106559658 A * 4/2017
CN 106559658 B * 8/2017

(Continued)

OTHER PUBLICATIONS

Epson User's Guide Business Projector EB-1485FT, EB-805F, EB-800F; Seiko Epson Corporation.

*Primary Examiner* — Vinh T Lam
(74) *Attorney, Agent, or Firm* — Oliff PLC

(57) ABSTRACT

A method of controlling a projector includes projecting an achromatic area image representing a drawing area in which the projector receives drawing using a pointer on a projection surface at a first luminance at a ratio on the projection surface, the ratio being smaller than or equal to a specific ratio to a maximum luminance at which the projector capable of project an image on the projection surface, detecting a position on the projection surface pointed by the pointer while projecting the area image, determining whether or not the position is included in the drawing area, and displaying, by the projector, an area including at least a part of an outline of the drawing area at a luminance higher than the first luminance when it is determined that the position is included in the drawing area.

7 Claims, 9 Drawing Sheets

(56) References Cited

U.S. PATENT DOCUMENTS

| | | | |
|---|---|---|---|
| 9,678,565 B2* | 6/2017 | Nagai | G06F 3/01 |
| 9,762,869 B2* | 9/2017 | Nakashin | H04N 9/3185 |
| 10,142,600 B2* | 11/2018 | Nakagoshi | G03B 21/60 |
| 10,431,131 B2* | 10/2019 | Ano | G06T 7/62 |
| 10,511,819 B2* | 12/2019 | Karasawa | G06F 3/03542 |
| 10,616,541 B2* | 4/2020 | Oike | H04N 9/3182 |
| 11,131,911 B2* | 9/2021 | Ichieda | H04N 9/3194 |
| 11,614,835 B2* | 3/2023 | Kusakabe | G09G 5/02 |
| | | | 345/175 |
| 11,624,971 B2* | 4/2023 | Nakagoshi | G03B 21/14 |
| | | | 353/100 |
| 2015/0205345 A1 | 7/2015 | Naess et al. | |
| 2018/0131913 A1* | 5/2018 | Nakagoshi | H04N 9/3182 |
| 2019/0033935 A1 | 1/2019 | Ozaki | |
| 2019/0124309 A1* | 4/2019 | Ichieda | H04N 9/3185 |
| 2020/0183534 A1* | 6/2020 | Yamauchi | G06F 3/03542 |
| 2021/0051305 A1* | 2/2021 | Takahashi | G09G 5/00 |

FOREIGN PATENT DOCUMENTS

| | | | | |
|---|---|---|---|---|
| CN | 109840056 A | * | 6/2019 | G06F 3/03542 |
| CN | 111083457 A | * | 4/2020 | H04N 9/3147 |
| CN | 107407995 B | * | 6/2020 | G06F 1/1639 |
| CN | 112770095 A | * | 5/2021 | |
| CN | 113163183 A | * | 7/2021 | G06Q 30/0631 |
| EP | 3780585 A1 | * | 2/2021 | G06T 5/009 |
| JP | 2009-104331 A | | 5/2009 | |
| JP | 2017-097852 A | | 6/2017 | |
| JP | 2018-160265 A | | 10/2018 | |
| JP | 2019-029814 A | | 2/2019 | |
| WO | WO-2018223838 A1 | * | 12/2018 | G03B 21/56 |

* cited by examiner

METHOD OF CONTROLLING PROJECTOR AND PROJECTOR

The present application is based on, and claims priority from JP Application Serial Number 2021-121304, filed Jul. 26, 2021, the disclosure of which is hereby incorporated by reference herein in its entirety.

BACKGROUND

1. Technical Field

The present disclosure relates to a method of controlling a projector, and a projector.

2. Related Art

There has been known a technology of projecting an image on a whiteboard or a blackboard.

A video information terminal device described in, for example, JP-A-2017-97852 (Document 1) displays a reservation list including information related to reservation times, reservation holders, and contents of reservations for a meeting room on a video display via a video outputter. Further, the video information terminal device displays a digital minute obtained by capturing the video display with the luminance inverted when the video display is a whiteboard, and displays the digital minute with the background transparentized when the video display is a blackboard or the like.

Further, a projection system described in JP-A-2018-160265 (Document 2) is provided with a light emission device for emitting a detection light to a detection area in which a pointing position of a pointer is detected, and a projector for detecting the pointing position of the pointer in the detection area. The projector is provided with an imager for imaging the detection area, and a position detector for detecting the pointing position of the pointer based on taken image data of the imager.

However, when performing the display with the background transparentized as described in, for example, Document 1, it is unachievable to detect a drawing area in which drawing with the pointer is received using the taken image generated by the imager imaging the detection area as described in Document 2, and therefore, there is a possibility that the drawing by the user with the pointer becomes difficult.

SUMMARY

An aspect of the present disclosure is directed to a method of controlling a projector including projecting an achromatic area image representing a drawing area in which the projector receives drawing using a pointer on a projection surface at a first luminance at a ratio smaller than or equal to a specific ratio to a maximum luminance at which the projector capable of project an image on the projection surface, detecting a position on the projection surface pointed by the pointer while projecting the area image, determining whether or not the position is included in the drawing area, and displaying, by the projector, an area including at least a part of an outline of the drawing area at a luminance higher than the first luminance when it is determined that the position is included in the drawing area.

Another aspect of the present disclosure is directed to a projector including a light source, a light modulation device configured to modulate light from the light source to emit image light, a detection device configured to detect a position on a projection surface pointed by a pointer, and a controller configured to control the light modulation device and the detection device, wherein the controller performs making the light modulation device project an achromatic area image representing a drawing area in which drawing with the pointer is received on a projection surface at a first luminance at a ratio smaller than or equal to a specific ratio to a maximum luminance at which an image is projected on the projection surface, making the detection device detect a position on the projection surface pointed by the pointer while projecting the area image, determining whether or not the position is included in the drawing area, and making the light modulation device display an area including at least a part of an outline of the drawing area at a luminance higher than the first luminance when it is determined that the position is included in the drawing area.

DESCRIPTION OF EXEMPLARY EMBODIMENTS

Some embodiments will hereinafter be described with reference to the drawings. It should be noted that the present embodiments include a first embodiment described with reference to FIG. 5 through FIG. 7, and a second embodiment described with reference to FIG. 8 and FIG. 9.

1. Configuration of Projection System 1

Figure 1:
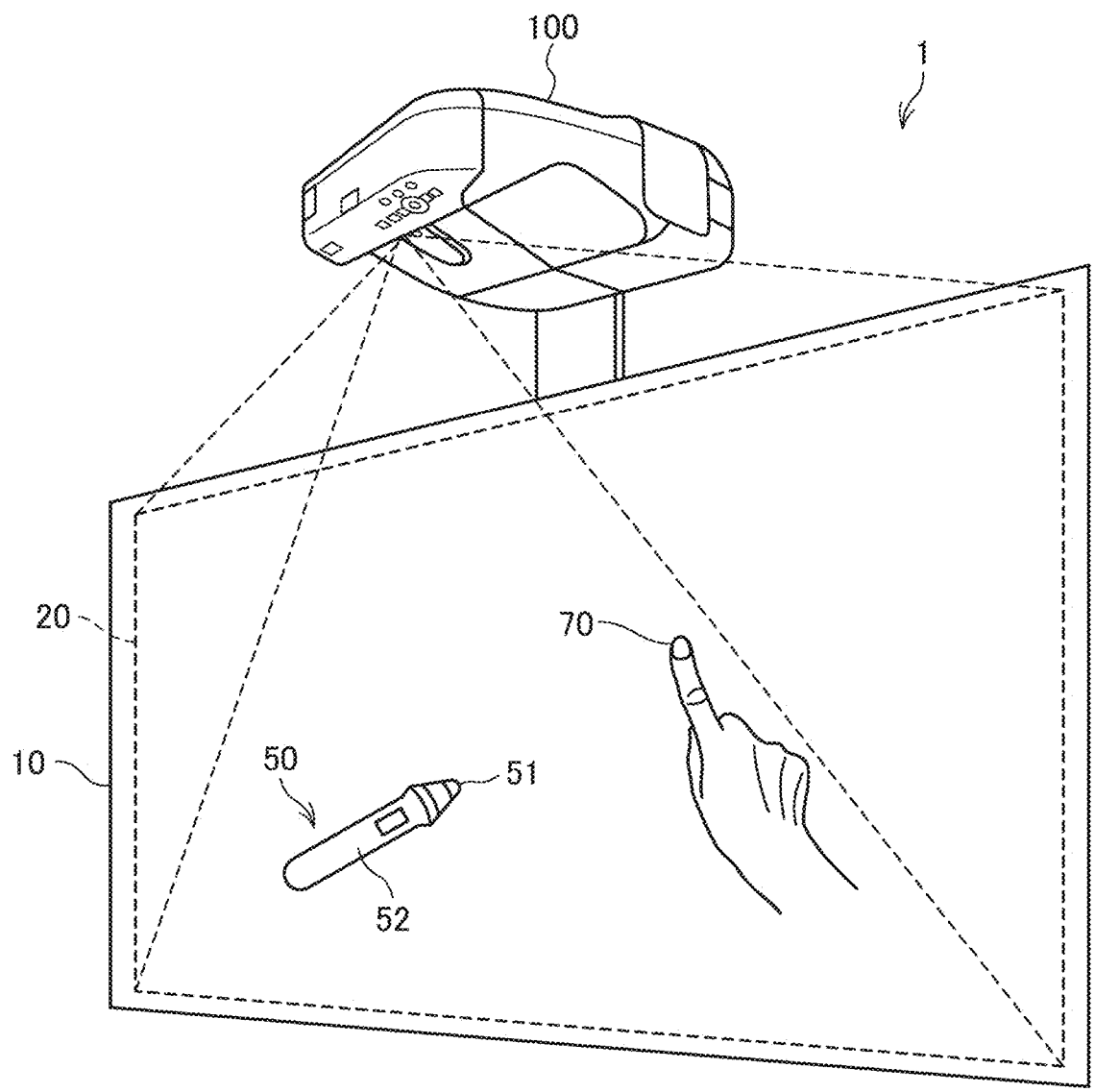
FIG. 1 is a perspective view showing an example of a configuration of a projection system.

FIG. 1 is a perspective view showing an example of a configuration of a projection system 1.

The projection system 1 is provided with a projector 100, a projection surface 10, and a first pointer 50. The projection surface 10 is a surface on which the projector 100 projects an image. The first pointer 50 is used by a user pointing a position PS on the projection surface 10.

It should be noted that pointing of the position PS on the projection surface 10 can be achieved by pointing with a second pointer 70 as a finger or the like of the user.

In FIG. 1, there are illustrated an X axis, a Y axis, and a Z axis perpendicular to each other. The Z axis represents a direction parallel to a normal direction of the projection surface 10. The Y axis represents a direction parallel to a vertical direction. The X axis represents a direction perpendicular to each of the Z axis and the Y axis. A positive direction of the Z axis is hereinafter described as a "front side" in some cases. A positive direction of the Y axis is described as a "lower side" in some cases. A positive direction of the X axis is described as a "right side" in some cases.

The projector 100 generates image light corresponding to image data, and then projects the image light thus generated on the projection surface 10. Further, the projector 100 is provided with a so-called "interactive function." The "interactive function" means a function of detecting the position PS on the projection surface 10 pointed by the first pointer 50 or the second pointer 70, and displaying an image corresponding to the position PS or a trajectory of the first pointer 50 or the second pointer 70 on the projection surface 10, or changing the image displayed on the projection surface 10, based on the position PS thus detected.

The first pointer 50 is a pen-type pointer used by the user in his or her hand, and has a tip 51 capable of emitting light, a shaft 52 gripped by the user, and so on. On the tip 51, there is mounted a light emitter 55 such as an LED (Light Emitting Diode) for emitting near-infrared light. The light emitter 55 emits light at predetermined light emission intervals in the state in which the tip 51 has contact with the projection surface 10. Further, the light emitter 55 also emits light at predetermined light emission intervals in the state in which the tip 51 does not have contact with the projection surface 10.

FIG. 1 shows a single first pointer 50, but the number of the first pointers 50 which can be used at the same time is not limited to one, and it is possible to use a plurality of the first pointers 50 at the same time.

The first pointer 50 corresponds to an example of a "pointer."

The first pointer 50 will further be described with reference to FIG. 3.

Further, when using the finger of the user as the second pointer 70, the user makes a tip of the finger or the like have contact with the projection surface 10 to point the position PS on the projection surface 10.

The projector 100 emits the detection light along the projection surface 10, and when the tip of the second pointer 70 makes contact with the projection surface 10, the detection light is blocked. The detection light is hereinafter referred to as second light 180. The second light 180 is reflected by the second pointer 70, and a part of the reflected light of the second light 180 proceeds from the second pointer 70 toward the projector 100. The projector 100 detects the reflected light which is the second light 180 reflected by the second pointer 70, to thereby detect the position PS pointed by the second pointer 70.

The second pointer 70 corresponds to an example of the "pointer."

In other words, in the present embodiments, the "pointer" includes the first pointer 50 and the second pointer 70.

Figure 2:
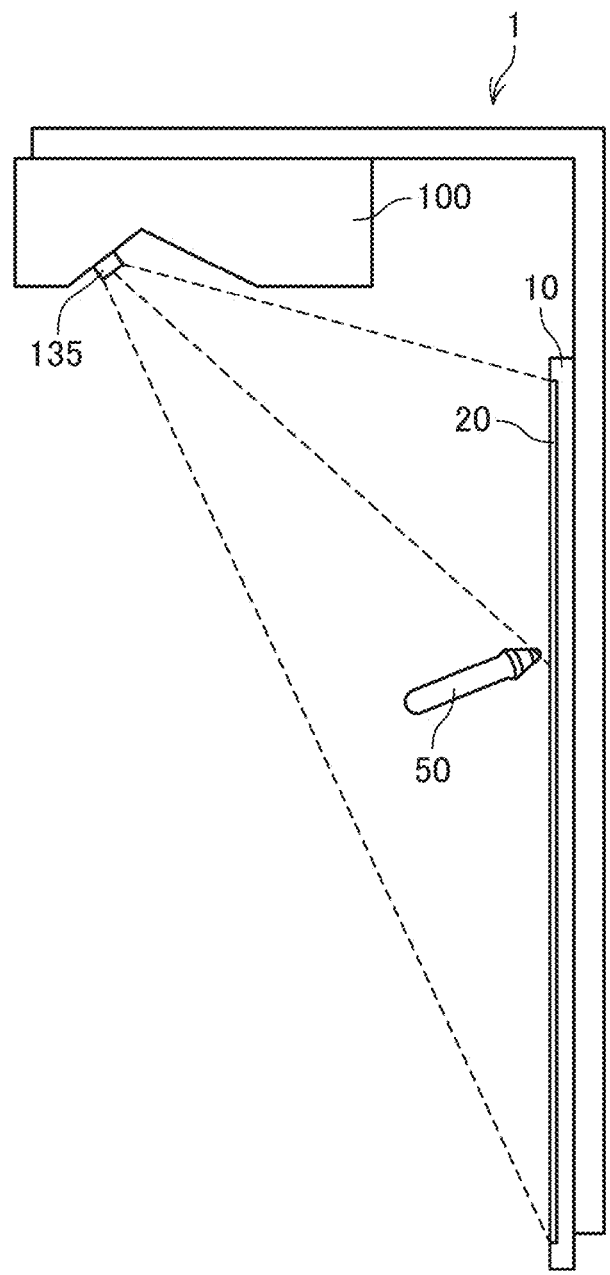
FIG. 2 is a side view showing an example of the projection system.

FIG. 2 is a side view showing an example of the projection system 1.

In the present embodiments, the projector 100 is fixed to, for example, a wall surface to be installed in front of and above the projection surface 10. The projector 100 projects the image light toward the projection surface 10 located obliquely below the projector 100. The drawing area 20 is an area on the projection surface 10 on which the image light is projected by the projector 100. The projector 100 receives the drawing with the pointer in the drawing area 20. Further, the projector 100 emits the second light 180 used for detecting the first pointer 50 and the second pointer 70 toward the direction corresponding to the projection surface 10.

The direction in which the second light 180 is emitted is a direction in which the reflected light reflected by, for example, the second pointer 70 having approached within a predetermined distance from the projection surface 10 can be made to enter an imager 135. The second light 180 is light to be used for the detection of the position PS of the second pointer 70, and is infrared light in the present embodiments. Since the second light 180 is the infrared light, it is possible to detect the second pointer 70 without being affected by the image light mainly consisting of visible light, and further, no influence is made on the display with the image light. A range including at least a part of the projection surface 10 is irradiated with the second light 180. In the present embodiments, the second light 180 is projected in a range covering, for example, the entire area of the projection surface 10.

The second light 180 will further be described with reference to FIG. 3.

2. Configuration of Projector 100 and First Pointer 50

Figure 3:
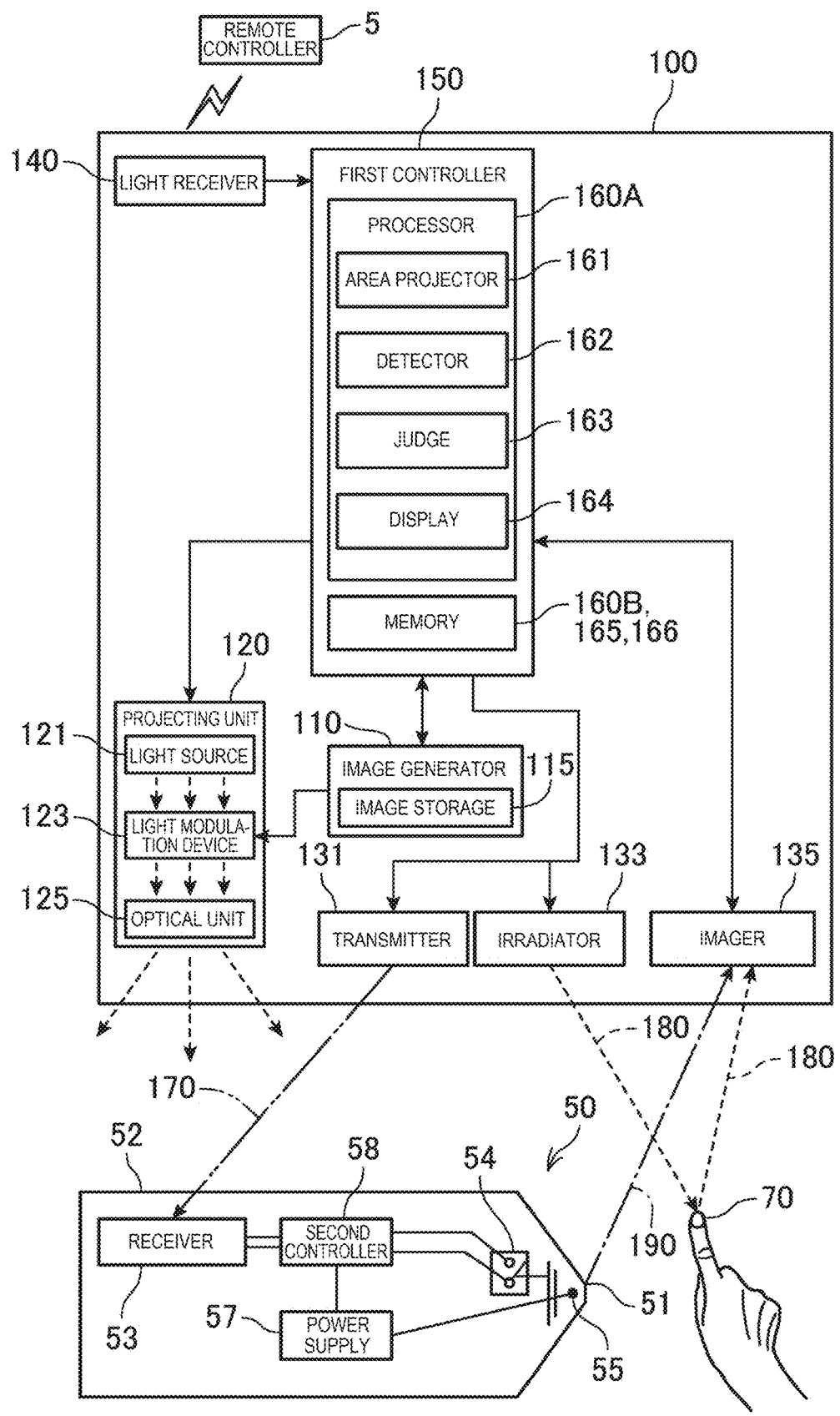
FIG. 3 is a diagram showing an example of a configuration of a projector and a first pointer according to embodiments.

FIG. 3 is a diagram showing an example of the configuration of the projector 100 and the first pointer 50.

First, the configuration of the projector 100 will be described. The projector 100 is provided with an image generator 110, a projecting unit 120, a transmitter 131, an irradiator 133, the imager 135, a light receiver 140, and a first controller 150.

The image generator 110 is an information processing device including a processor such as a CPU (Central Processing Unit) or a GPU (Graphics Processing Unit). The image generator 110 has an image storage 115 for storing an image to be projected by the projecting unit 120. The image storage 115 is a so-called "frame memory" for storing the image to be projected by the projecting unit 120 frame by frame. In the following description, the image to be projected by the projecting unit 120 is described as a "projection image" in some cases.

The image generator 110 draws the projection image to be projected on the projection surface 10 in the image storage 115 based on the image data. The image generator 110 outputs the image signal representing the image drawn in the image storage 115 to a light modulation device 123 described later to make the light modulation device 123 output the image light corresponding to the image data. The image light generated by the light modulation device 123 is projected on the projection surface 10 by the projecting unit 120.

Further, the image generator 110 executes image processing on the image to be drawn in the image storage 115. For example, the image generator 110 executes geometric correction processing of correcting the keystone distortion or the like of the drawing area 20, digital zoom processing of expanding or reducing a size of the image to be displayed on the projection surface 10, color correction processing of correcting a color tone and so on of the image to be displayed on the projection surface 10, and so on.

The projecting unit 120 is provided with a light source 121, the light modulation device 123, and an optical unit 125.

The light source 121 is provided with a light source such as a xenon lamp, a super-high pressure mercury lamp, an LED, or a laser source. Further, the light source 121 can also be provided with a reflector and an auxiliary reflector for guiding light emitted by the light source to the light modulation device 123.

The light modulation device 123 is provided with a modulation element such as a liquid crystal panel. The light modulation device 123 modulates the light entering the light modulation device 123 from the light source 121 to form the image light in accordance with the image signal input from the image storage 115. The image light is typically color image light including visible light of three colors of red (R), green (G), and blue (B).

In the present embodiments, there is described when the light modulation device 123 is provided with the modulation element such as liquid crystal panels, but this is not a limitation. There can be adopted a so-called DLP (Digital Light Processing) system in which the light modulation device 123 is provided with a DMD (Digital Mirror Device).

The optical unit 125 projects the image light formed by the light modulation device 123 on the projection surface 10 to form an image on the projection surface 10. The optical unit 125 includes at least one of a lens and a mirror. The optical unit 125 can also be provided with a zoom mechanism for expanding or reducing the image to be projected on the projection surface 10, and a focus adjustment mechanism for performing an adjustment of the focus.

The transmitter 131 outputs signal light 170 as a signal for synchronizing light emission timing of the first pointer 50 with imaging timing of the imager 135. The signal light 170 is represented by a dashed-two dotted line in FIG. 3. The signal light 170 is, for example, a signal of the near-infrared light which can be received by the receiver 53. In a start-up state of the projector 100, the transmitter 131 transmits the signal light 170 at predetermined time intervals.

The signal light 170 represents a control signal for designating timing for, for example, making the first pointer 50 transmit first light 190. The first light 190 is near-infrared light having a predetermined light emission pattern. In FIG. 3, the first light 190 is represented by a dashed-dotted line. The first pointer 50 transmits the first light 190 in sync with, for example, the timing at which the signal light 170 is received.

In such a manner, it becomes possible for the projector 100 to make the imager 135 execute imaging in sync with the timing at which the first pointer 50 emits the first light 190. The transmitter 131 is provided with a light source such as an LED, and a device for controlling lighting and extinction of the light source. The device for controlling lighting and extinction of the light source can be formed of, for example, an ASIC (Application Specific Integrated Circuit), or an FPGA (Field-Programmable Gate Array).

The irradiator 133 emits the second light 180 for detecting the first pointer 50 and the second pointer 70 toward the direction including the projection surface 10. In FIG. 3, the second light 180 is represented by dotted lines. The irradiator 133 has an LD (Laser Diode) or an LED as the light source for outputting the infrared light. Further, it is also possible for the irradiator 133 to be provided with an optical component for diffusing the infrared light emitted by the light source, toward the projection surface 10.

The imager 135 is a camera provided with an imaging element such as a CMOS (Complementary Metal Oxide Semiconductor) or a CCD (Charge Coupled Device) for receiving the near-infrared light output by the light emitter 55 of the first pointer 50. Further, the imager 135 is provided with an optical system for forming an image on the imaging element, a diaphragm for limiting an amount of light entering the imaging element, and so on.

The imager 135 images a range including the projection surface 10 to form a taken image. The imager 135 receives the first light 190 output by the first pointer 50 to perform imaging. The taken image generated by the imager 135 is output to the first controller 150.

The imager 135 corresponds to a part of a "detection device."

When performing imaging, the imager 135 outputs an interrupt signal to the first controller 150. When the imager 135 receives a response to the interrupt signal from the first controller 150, the imager 135 outputs the taken image to the first controller 150.

The light receiver 140 receives an infrared signal transmitted from a remote controller 5. The light receiver 140 generates an operation signal corresponding to the infrared signal thus received, and then outputs the operation signal thus generated to the first controller 150. The operation signal is a signal corresponding to a switch of the remote controller 5 operated by the user.

The first controller 150 is a computer device provided with a memory 160B and a processor 160A. The memory 160B is provided with a volatile memory such as a RAM (Random Access Memory), and a nonvolatile memory such as a ROM (Read Only Memory). The volatile memory constitutes a work area of the processor 160A.

The nonvolatile memory stores a control program to be executed by the processor 160A, and calibration data 166. The control program includes firmware and an application program 165.

The first controller 150 corresponds to an example of a "controller."

The calibration data 166 is data for making the taken image and the drawing area 20 of the projection surface 10 correspond to each other. Specifically, the calibration data 166 is data for making coordinates of pixels in the coordinate system of the taken image and coordinates of pixels in the coordinate system of the image storage 115 correspond to each other. In the present embodiments, the coordinate system of the taken image is described as a "camera coordinate system," and the coordinate system of the image storage 115 is described as a "panel coordinate system." By referring to the calibration data 166, the position PS in the drawing area 20 corresponding to one position on the taken image is uniquely identified.

The application program 165 is a program to be executed by the processor 160A. The application program 165 includes a program which realizes the interactive function.

The processor 160A is constituted by, for example, a CPU or an MPU (Micro Processor Unit). The processor 160A executes the control program to thereby control the constituents of the projector 100. The processor 160A can be constituted by a plurality of processors.

The first controller 150 detects the first light 190 imaged in the taken image, and the reflected light which is the second light 180 reflected by the first pointer 50. The first controller 150 analyzes the taken image generated by the imager 135 to identify the position PS pointed by the first pointer 50 and the second pointer 70. The first controller 150 generates coordinate information representing each of a position of a light spot of the first light 190 thus detected, and a position of a light spot of the reflected light of the second light 180. These pieces of the coordinate information are expressed in the camera coordinate system.

The processing described above by the first controller 150 is executed by, for example, a detector 162 described later.

The first controller 150 converts the coordinate information expressed in the camera coordinate system into coordinate information in the panel coordinate system. The conversion is performed based on the calibration data 166 generated by, for example, the calibration performed in advance.

The first controller 150 controls the constituents of the projector 100 to display the image on the projection surface 10. Further, the first controller 150 generates drawing data representing an image, a figure, a character, a symbol, or the like corresponding to the trajectory of the position PS on the projection surface 10 pointed by the first pointer 50 and the second pointer 70. The first controller 150 outputs the drawing data thus generated to the image generator 110. The first controller 150 controls the image generator 110 to develop the image data at the coordinates on the image storage 115 based on the coordinate information thus converted. Thus, the drawing data is superimposed on the image data, and is displayed on the projection surface 10.

The processing described above by the first controller 150 is executed by, for example, a display 164 described later.

Then, the configuration of the first pointer 50 will be described.

The first pointer 50 is provided with the tip 51, the shaft 52, the receiver 53, a tip switch 54, the light emitter 55, a power supply 57, and a second controller 58.

The receiver 53 includes a light receiving element for receiving the near-infrared light, and so on, and receives the signal light 170 transmitted by the projector 100. The receiver 53 outputs a control signal representing the timing at which the signal light 170 is received and so on to the second controller 58.

The tip switch 54 is a switch which turns ON when the tip 51 makes contact with the projection surface 10 to hold down the tip 51, and turns OFF when the contact between the tip 51 and the projection surface 10 is released.

The light emitter 55 includes an LED for emitting the near-infrared light, and is controlled in light emission by the second controller 58, and emits the first light 190 as the near-infrared light.

The power supply 57 is provided with a battery such as a primary cell, a secondary cell, or a photoelectric cell, and supplies the constituents of the first pointer 50 with electrical power. The first pointer 50 can also be provided with a power switch for switching ON/OFF the power supply from the power supply 57.

The second controller 58 is provided with a processor such as a CPU, a storage device such as a memory, and a variety of peripheral circuits. In other words, the second controller 58 is provided with a function as a computer. The second controller 58 controls the constituents of the first pointer 50 by the processor executing a program stored in the storage device. Further, the second controller 58 can have a configuration provided with a plurality of processors.

The second controller 58 decides the light emission timing as the timing of making the light emitter 55 emit light based on the control signal input from the receiver 53. The second controller 58 makes the light emitter 55 emit light at the light emission timing thus decided to output the first light 190.

3. Configuration of First Controller 150

Then, the configuration of the first controller 150 will further be described.

The first controller 150 is provided with an area projector 161, the detector 162, a judge 163, and the display 164. Specifically, the processor 160A of the first controller 150 executes the control program stored in the memory 160B to thereby function as the area projector 161, the detector 162, the judge 163, and the display 164.

It should be noted that in the following description, there is explained when the pointer is the first pointer 50. The pointer can be the second pointer 70.

The area projector 161 projects an area image 21 on the projection surface 10 at a first luminance B1 at a ratio smaller than or equal to a specific ratio to the maximum luminance at which the projector 100 can project an image on the projection surface 10. The area image 21 is an image representing the drawing area 20 in which the projector 100 receives the drawing with the first pointer 50, and is an achromatic image.

The first luminance B1 is only required to be a luminance at a ratio smaller than or equal to the specific ratio lower than the maximum luminance, and is, for example, smaller than or equal to 50% of the maximum luminance. Further, the first luminance B1 can be, for example, smaller than or equal to 30% of the maximum luminance. In the present embodiments, the first luminance B1 is, for example, 10% of the maximum luminance.

The area image 21 will further be described with reference to FIG. 4.

The detector 162 detects the position PS on the projection surface 10 pointed by the first pointer 50 while projecting the area image 21. Specifically, the detector 162 detects the first light 190 imaged in the taken image, and the reflected light which is the second light 180 reflected by the first pointer 50. The detector 162 analyzes the taken image generated by the imager 135 to detect the position PS of the first pointer 50 on the projection surface 10.

The detector 162 corresponds to a part of the "detection device." In other words, in the present embodiments, the "detection device" includes the imager 135 and the detector 162.

The judge 163 determines whether or not the position PS of the first pointer 50 on the projection surface 10 is included in the drawing area 20.

Specifically, when the coordinate (X,Y) in the camera coordinate system of the position PS pointed by the first pointer 50 detected by the detector 162 is included in a range of the coordinates representing the projection surface 10 in the camera coordinate system, the judge 163 determines that the position PS of the first pointer 50 on the projection surface 10 is included in the drawing area 20. The range of the coordinates representing the projection surface 10 in the camera coordinate system is, for example, (0,0) through (1919,1079). Therefore, when the X coordinate of the position PS is in a range of 0 through 1919, and at the same time, the Y coordinate of the position PS is in a range of 0 through 1079, the judge 163 determines that the position PS of the first pointer 50 on the projection surface 10 is included in the drawing area 20.

The camera coordinate system represents, for example, positions of the pixels constituting the imaging element of the imager 135. As the pixels constituting the imaging element of the imager 135, 1920 pixels are arranged in the X-axis direction, and 1080 pixels are arranged in the Y-axis direction to form a grid arrangement. The number of the pixels constituting the imaging element of the imager 135 is 1920×1080.

The camera coordinate system will further be described with reference to FIG. 4.

Further, when the judge 163 has determined that the position PS of the first pointer 50 on the projection surface 10 is included in the drawing area 20, the judge 163 determines whether or not a specific area AR having a predetermined shape including the position PS overlaps an outline 210 of the drawing area 20.

The predetermined shape is, for example, a circular shape. Further, a radius of the specific area AR is, for example, 50 pixels. The specific area AR is a circle centering on the position PS, and having the radius of 50 pixels.

When the shortest distance between the position PS and the outline 210 of the drawing area 20 is no more than 50 pixels, the judge 163 determines that the specific area AR overlaps the outline 210 of the drawing area 20. In other words, when a part of the outline 210 exists within the radius of 50 pixels from the position PS, the judge 163 determines that the specific area AR overlaps the outline 210 of the drawing area 20.

When the judge 163 has determined that the position PS is included in the drawing area 20, the display 164 displays an area including at least a part of the outline 210 of the drawing area 20 at a luminance higher than the first luminance B1 using the projector 100.

In the first embodiment described with reference to FIG. 5 through FIG. 7, when the judge 163 has determined that the position PS is included in the drawing area 20, the display 164 displays a portion 211 of the outline 210 overlapping the specific area AR at, for example, a third luminance B3 higher than the first luminance B1.

Further, it is possible for the display 164 to display the portion 211 of the outline 210 overlapping the specific area AR with a chromatic color when, for example, the judge 163 has determined that the position PS is included in the drawing area 20. The chromatic color is, for example, a red color.

In the first embodiment, there is described when the display 164 displays the portion 211 of the outline 210 overlapping the specific area AR at, for example, the third luminance B3 higher than the first luminance B1 when the judge 163 has determined that the position PS is included in the drawing area 20, but this is not a limitation.

It is possible for the display 164 to display a whole of the outline 210 at, for example, a second luminance B2 higher than the first luminance B1, while displaying the area image 21 at the first luminance B1 in an inside area of the outline 210 when the judge 163 has determined that the position PS is included in the drawing area 20. The second luminance B2 is, for example, 30% of the maximum luminance at which the projector 100 can perform the projection on the projection surface 10.

In this case, since the whole of the outline 210 is displayed at the second luminance B2 higher than the first luminance B1, it is possible for the user to confirm the position of the whole of the outline 210. Therefore, it is possible to enhance the convenience of the user.

In the second embodiment described with reference to FIG. 8 and FIG. 9, when the judge 163 has determined that the position PS is included in the drawing area 20, the display 164 displays a whole of the drawing area 20 at, for example, a fourth luminance B4 higher than the first luminance B1. In other words, when the position PS pointed by the first pointer 50 is not included in the drawing area 20, the drawing area 20 is displayed at the first luminance B1, and when the position PS is included in the drawing area 20, the drawing area 20 is displayed at the fourth luminance B4 higher than the first luminance B1.

4. First Embodiment

Then, the first embodiment will be described with reference to FIG. 4 through FIG. 7.

Figure 4:
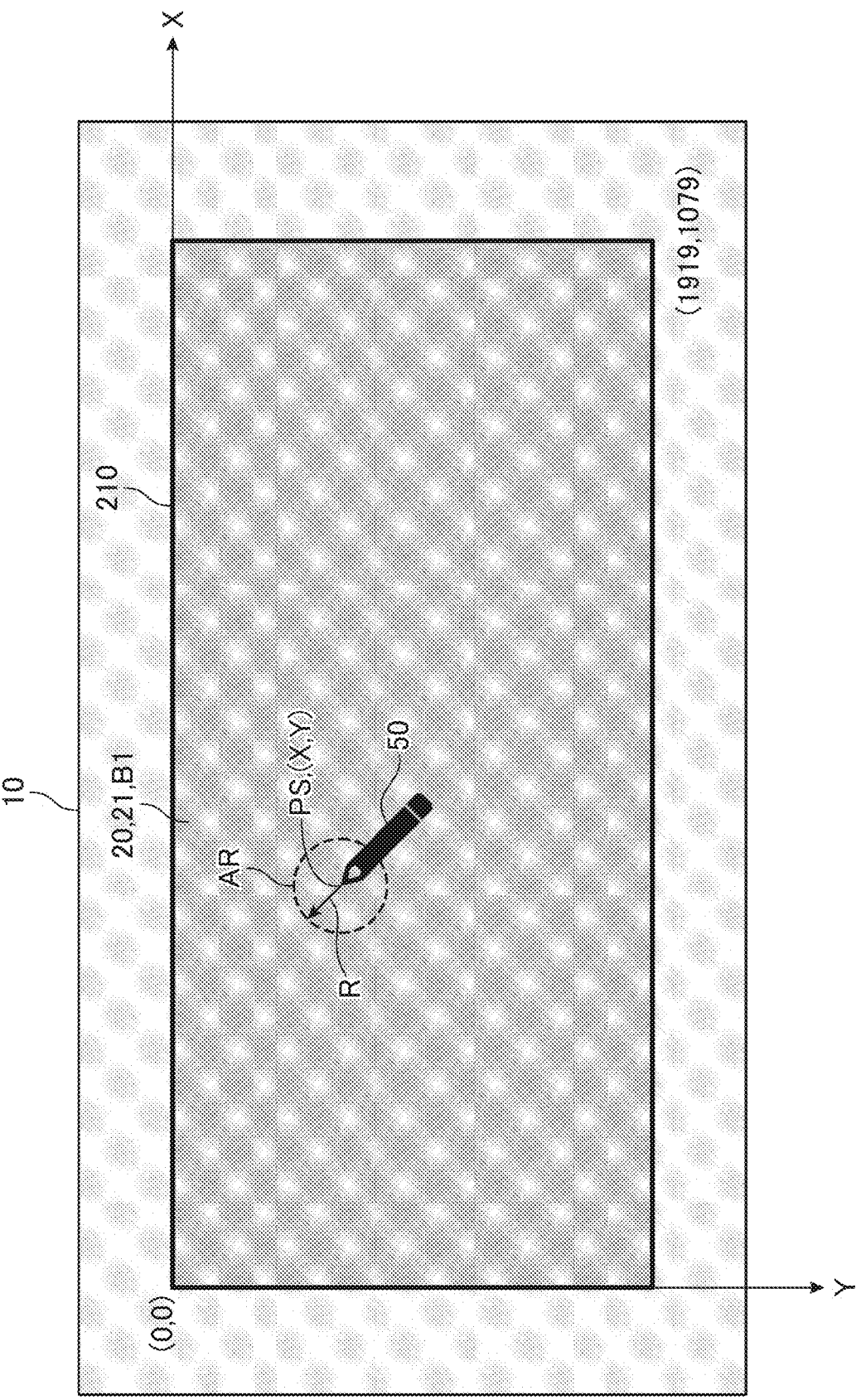
FIG. 4 is a diagram showing an example of a drawing area and a specific area in a first embodiment.

FIG. 4 is a diagram showing an example of the drawing area 20 and the specific area AR in the first embodiment.

As shown in FIG. 4, the drawing area 20 is arranged on the projection surface 10. The drawing area 20 is an area on the projection surface 10 on which the image light is projected by the projector 100.

The projection surface 10 is, for example, a whiteboard or a surface of a wall. The drawing area 20 is arranged at substantially the center of the projection surface 10.

The drawing area 20 is formed to have a rectangular shape. A long-side direction of the drawing area 20 is parallel to the X-axis direction, and a short-side direction of the drawing area 20 is parallel to the Y-axis direction.

The origin of the (X,Y) coordinate representing the position PS pointed by the first pointer 50 is, for example, an upper left end in the drawing area 20, namely a position at an end in the negative direction of the X axis, and at the same time, a position at an end in the negative direction of the Y axis shown in FIG. 4. The coordinate of the lower right end of the drawing area 20 is (1919,1079). In other words, the range of the (X,Y) coordinates of the drawing area 20 is a range of 0 through 1919 in the X coordinate, and at the same time, a range of 0 through 1079 in the Y coordinate.

The outline 210 is an outline of the drawing area 20.

The specific area AR is an area shaped like a circle centering on the position PS pointed by the first pointer 50, and having a radius R. The radius R is, for example, 50 pixels.

The area projector 161 projects the area image 21 on the projection surface 10 at the first luminance B1. The first luminance B1 is, for example, 10% of the maximum luminance at which the projector 100 can perform the projection on the projection surface 10.

Figure 5:
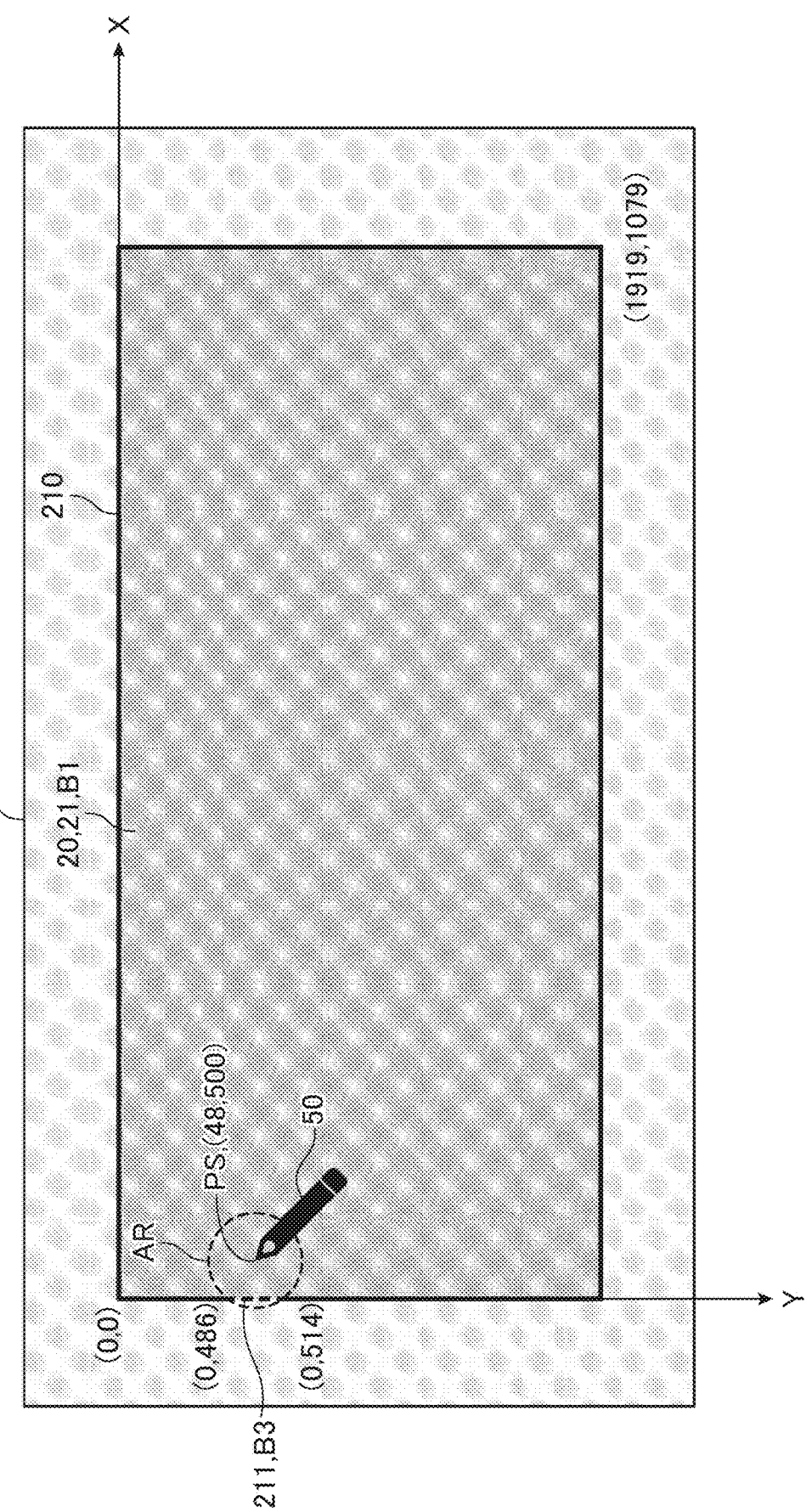
FIG. 5 is a diagram showing an example of display of a part of an outline overlapping the specific area in the first embodiment.

FIG. 5 is a diagram showing an example of the display of a part of the outline 210 overlapping the specific area AR in the first embodiment.

In FIG. 5, the (X,Y) coordinate of the position PS pointed by the first pointer 50 is (48,500). In other words, the position PS is arranged in the vicinity of a left side of the outline 210 of the drawing area 20.

In this case, the judge 163 determines that the position PS pointed by the first pointer 50 is included in the drawing area 20. Further, the judge 163 determines that the specific area AR overlaps the outline 210 of the drawing area 20. Then, the display 164 displays the portion 211 of the outline 210 overlapping the specific area AR at the third luminance B3 higher than the first luminance B1. The portion 211 is a part of the outline 210 overlapping the specific area AR. The third luminance B3 is, for example, 50% of the maximum luminance at which the projector 100 can perform the projection on the projection surface 10.

Further, the portion 211 is a line segment extending from a position with the (X,Y) coordinate of (0,486) to a position with the (X,Y) coordinate of (0,514).

The display 164 displays the portion 211 with a chromatic color (e.g., a red color). It should be noted that in FIG. 5 and FIG. 6, the fact that the portion 211 is red is expressed by describing the portion 211 with a dotted line.

Figure 6:
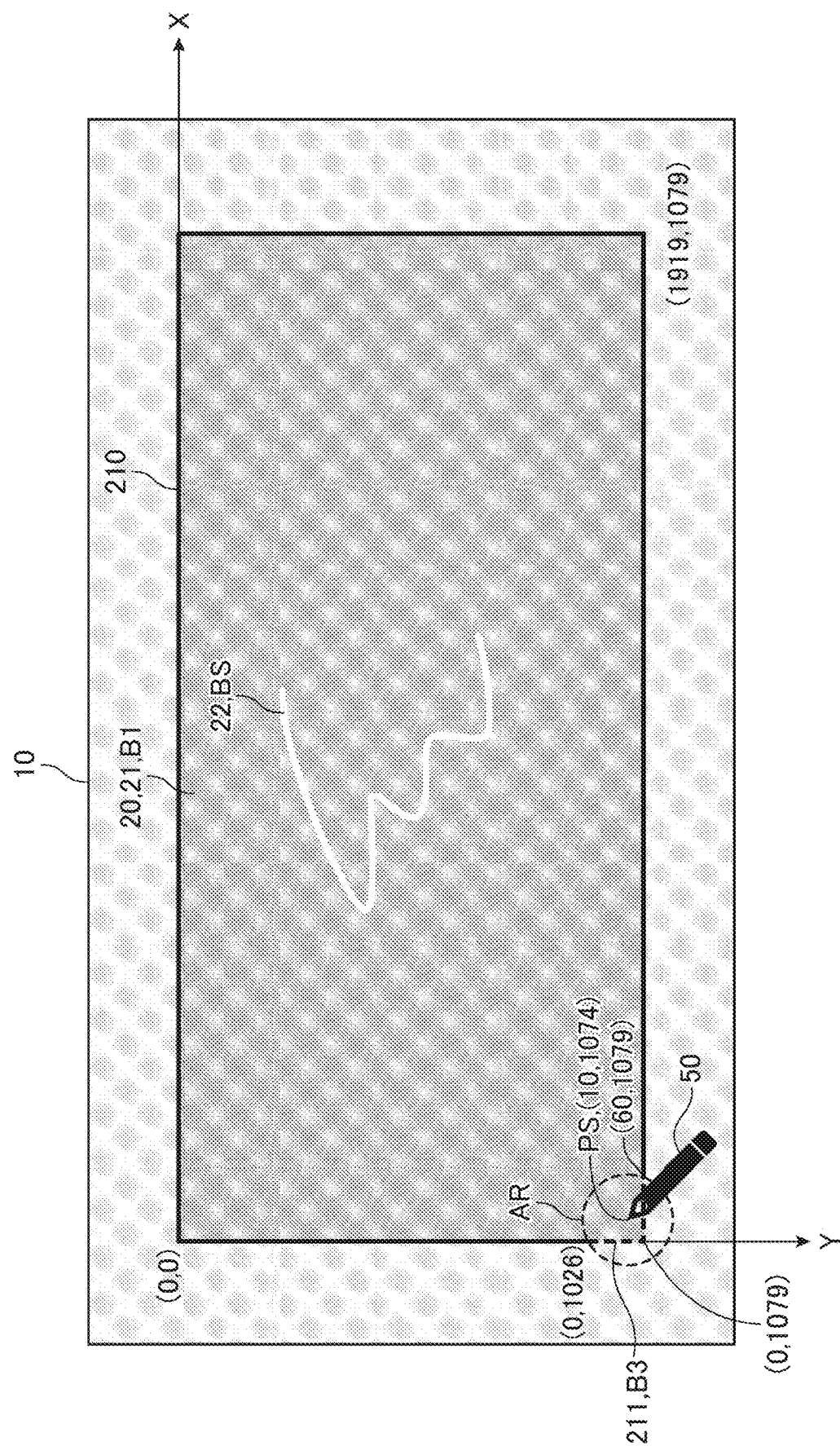
FIG. 6 is a diagram showing an example of the display of a part of the outline overlapping the specific area in the first embodiment.

FIG. 6 is a diagram showing an example of the display of a part of the outline 210 overlapping the specific area AR in the first embodiment.

In FIG. 6, the (X,Y) coordinate of the position PS pointed by the first pointer 50 is (10,1074). In other words, the position PS is arranged in the vicinity of the left side and a lower side of the outline 210 of the drawing area 20.

In this case, the judge 163 determines that the position PS pointed by the first pointer 50 is included in the drawing area 20. Further, the judge 163 determines that the specific area AR overlaps the outline 210 of the drawing area 20. Then, the display 164 displays the portion 211 of the outline 210 overlapping the specific area AR at the third luminance B3 higher than the first luminance B1. The portion 211 is a part where the outline 210 overlaps the specific area AR.

The third luminance B3 is, for example, 50% of the maximum luminance at which the projector 100 can perform the projection on the projection surface 10.

A part of the portion 211 is a lower end portion of the left side of the outline 210, and the rest of the portion 211 is a left end portion of the lower side of outline 210. Further, a part of the portion 211 is a line segment extending from a position with the (X,Y) coordinate of (0,1026) to a position with the (X,Y) coordinate of (0,1079). The rest of the portion 211 is a line segment extending from the position with the (X,Y) coordinate of (0,1079) to a position with the (X,Y) coordinate of (60,1079). The two line segments are coupled to each other at the lower left end of the outline 210, namely the point with the (X,Y) coordinate of (0,1079), and are arranged to have an L shape.

The display 164 displays the portion 211 with a chromatic color (e.g., a red color).

Further, in FIG. 6, there is displayed a hand-drawn image 22. The hand-drawn image 22 corresponds to the trajectory of the position PS on the projection surface 10 pointed by the first pointer 50. The luminance BS of the hand-drawn image 22 is a luminance set by the user. The luminance BS is, for example, the maximum luminance at which the projector 100 can perform the projection on the projection surface 10. Further, the color of the hand-drawn image 22 is a color (e.g., a white color) set by the user.

As described with reference to FIG. 5 and FIG. 6, when the judge 163 determines that the position PS is included in the drawing area 20, and at the same time, the judge 163 determines that the specific area AR overlaps the outline 210, the display 164 performs the following processing. That is, the display 164 displays the portion 211 of the outline 210 overlapping the specific area AR at the third luminance B3 higher than the first luminance B1. Therefore, it is possible for the user to recognize the position of the outline 210 near to the position PS pointed by the first pointer 50. Therefore, it is possible to enhance the convenience of the user. It should be noted that the fact that something is near to the position PS pointed by the first pointer 50 means that the distance from the position PS is no more than the radius R. The radius R is a radius of the specific area AR having a circular shape.

Further, since the display 164 displays the portion 211 of the outline 210 overlapping the specific area AR with the chromatic color (e.g., a red color), by appropriately setting the chromatic color, it is possible to improve the visibility of the portion 211 of the outline 210 overlapping the specific area AR. Therefore, it is possible to enhance the convenience of the user. As the chromatic color, it is preferable to set a brilliant color attracting the attention of the user.

Figure 7:
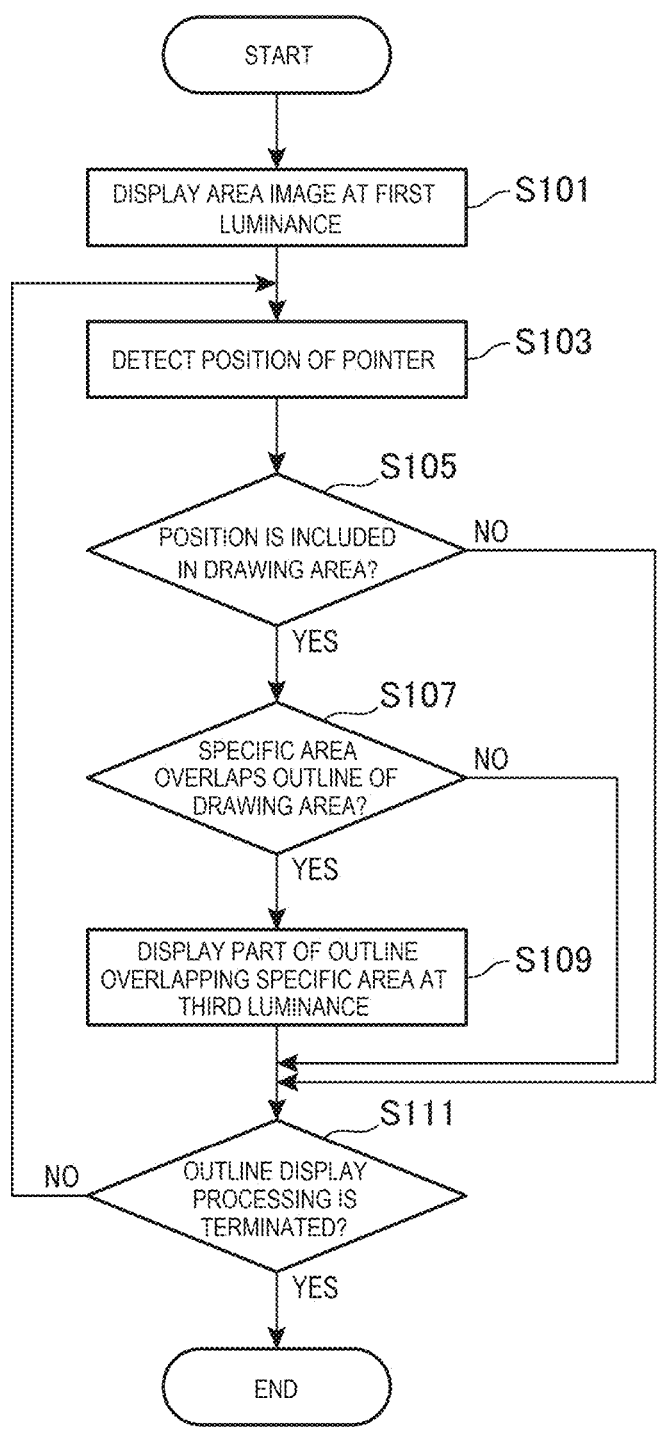
FIG. 7 is a flowchart showing an example of outline display processing of a first controller in the first embodiment.

FIG. 7 is a flowchart showing an example of outline display processing of the first controller 150 in the first embodiment.

The "outline display processing" means the following processing which the display 164 executes when the judge 163 determines that the position PS of the first pointer 50 on the projection surface 10 is included in the drawing area 20, and at the same time, the judge 163 determines that the specific area AR overlaps the outline 210 of the drawing area 20. Specifically, the display 164 displays the portion 211 of the outline 210 overlapping the specific area AR at the third luminance B3 higher than the first luminance B1 as described with reference to FIG. 5 and FIG. 6.

First, in the step S101, the area projector 161 projects the area image 21 on the projection surface 10 at the first luminance B1.

Then, in the step S103, the detector 162 detects the position PS on the projection surface 10 pointed by the first pointer 50 while projecting the area image 21.

Then, in the step S105, the judge 163 determines whether or not the position PS of the first pointer 50 on the projection surface 10 is included in the drawing area 20.

When the judge 163 has determined that the position PS of the first pointer 50 on the projection surface 10 is not included in the drawing area 20 (NO in the step S105), the process proceeds to the step S111. When the judge 163 has determined that the position PS of the first pointer 50 on the projection surface 10 is included in the drawing area 20 (YES in the step S105), the process proceeds to the step S107.

Then, in the step S107, the judge 163 determines whether or not the specific area AR including the position PS overlaps the outline 210 of the drawing area 20.

When the judge 163 has determined that the specific area AR does not overlap the outline 210 of the drawing area 20 (NO in the step S107), the process proceeds to the step S111. When the judge 163 has determined that the specific area AR overlaps the outline 210 of the drawing area 20 (YES in the step S107), the process proceeds to the step S109.

Then, in the step S109, the display 164 displays the portion 211 of the outline 210 overlapping the specific area AR at the third luminance B3 higher than the first luminance B1 using the projector 100.

Then, in the step S111, the first controller 150 receives an operation of the user, and then determines whether to terminate the outline display processing in accordance with the operation thus received.

When the first controller 150 has determined that the outline display processing is not terminated (NO in the step S111), the process returns to the step S103. For example, when an operation of instructing the termination of the processing is not input, the first controller 150 determines that the outline display processing is not terminated. When the first controller 150 has determined that the outline display processing is terminated (YES in the step S111), the process is then terminated. For example, when an operation of instructing the termination of the processing has been input, the first controller 150 determines that the outline display processing is terminated.

As described with reference to FIG. 7, when the position PS of the first pointer 50 on the projection surface 10 is included in the drawing area 20, and at the same time, the specific area AR overlaps the outline 210, the display 164 performs the following processing. That is, the display 164 displays the portion 211 of the outline 210 overlapping the specific area AR at the third luminance B3 higher than the first luminance B1. Therefore, it is possible for the user to recognize the position of the outline 210 near to the position PS pointed by the first pointer 50. Therefore, it is possible to enhance the convenience of the user.

5. Second Embodiment

Then, the second embodiment will be described with reference to FIG. 8 and FIG. 9.

Figure 8:
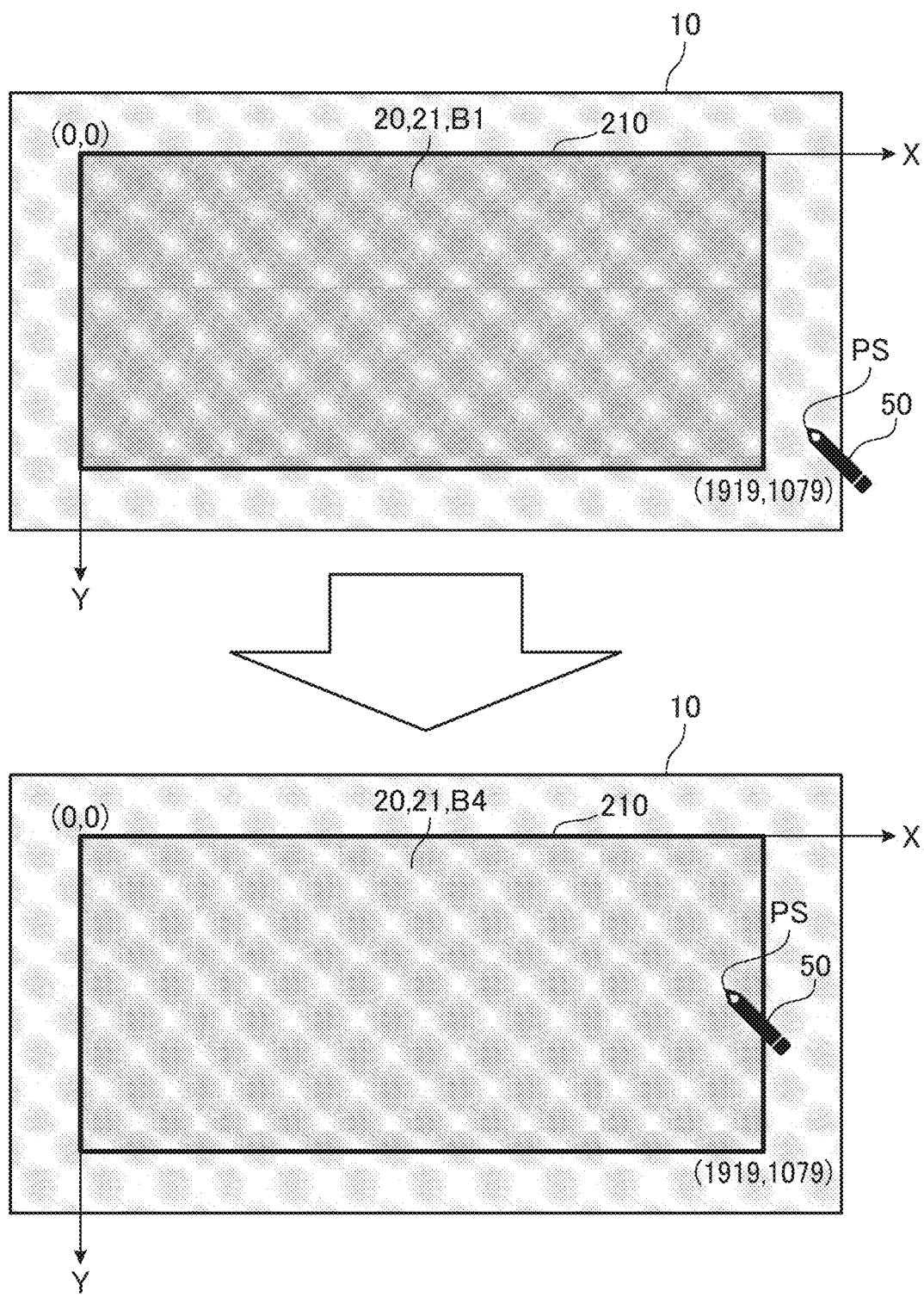
FIG. 8 is a diagram showing an example of luminance change processing of a drawing area in a second embodiment.

FIG. 8 is a diagram showing an example of a luminance change processing of the drawing area 20 in the second embodiment.

The "luminance change processing" means the processing of changing the luminance of the drawing area 20 in accordance with whether or not the position PS on the projection surface 10 pointed by the first pointer 50 is included in the drawing area 20. For example, when the position PS is not included in the drawing area 20, the display 164 projects the area image 21 on the projection surface 10 at the first luminance B1. When the position PS is included in the drawing area 20, the display 164 projects the area image 21 on the projection surface 10 at the fourth luminance B4 higher than the first luminance B1.

A diagram shown in an upper part of FIG. 8 shows an example of the drawing area 20 when the position PS on the projection surface 10 pointed by the first pointer 50 is not included in the drawing area 20. In the diagram shown in the upper part of FIG. 8, the position PS on the projection surface 10 pointed by the first pointer 50 is not included in the drawing area 20.

In this case, the display 164 projects the area image 21 on the projection surface 10 at the first luminance B1. The first luminance B1 is, for example, 10% of the maximum luminance at which the projector 100 can perform the projection on the projection surface 10.

A diagram shown in a lower part of FIG. 8 shows an example of the drawing area 20 when the position PS on the projection surface 10 pointed by the first pointer 50 is included in the drawing area 20. In the diagram shown in the lower part of FIG. 8, the position PS on the projection surface 10 pointed by the first pointer 50 is included in the drawing area 20.

In this case, the display 164 projects the area image 21 on the projection surface 10 at the fourth luminance B4 higher than the first luminance B1. The fourth luminance B4 is, for example, 20% of the maximum luminance at which the projector 100 can perform the projection on the projection surface 10.

Figure 9:
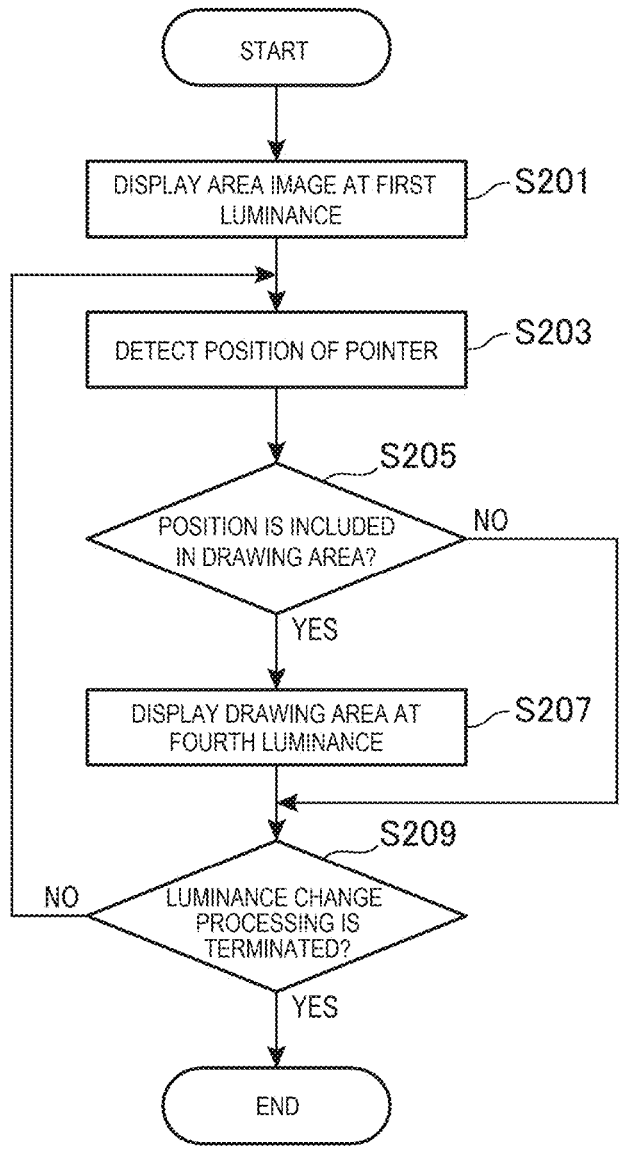
FIG. 9 is a flowchart showing an example of the luminance change processing of a first controller in the second embodiment.

FIG. 9 is a flowchart showing an example of the luminance change processing of the first controller 150 in the second embodiment.

First, in the step S201, the area projector 161 projects the area image 21 on the projection surface 10 at the first luminance B1.

Then, in the step S203, the detector 162 detects the position PS on the projection surface 10 pointed by the first pointer 50 while projecting the area image 21.

Then, in the step S205, the judge 163 determines whether or not the position PS of the first pointer 50 on the projection surface 10 is included in the drawing area 20.

When the judge 163 has determined that the position PS of the first pointer 50 on the projection surface 10 is not included in the drawing area 20 (NO in the step S205), the process proceeds to the step S209. When the judge 163 has determined that the position PS of the first pointer 50 on the projection surface 10 is included in the drawing area 20 (YES in the step S205), the process proceeds to the step S207.

Then, in the step S207, the display 164 projects the drawing area 20 on the projection surface 10 at the fourth luminance B4 higher than the first luminance B1 using the projector 100.

Then, in the step S209, the first controller 150 receives an operation of the user, and then determines whether to terminate the luminance change processing in accordance with the operation thus received.

When the first controller 150 has determined that the luminance change processing is not terminated (NO in the step S209), the process returns to the step S203. When the first controller 150 has determined that the luminance change processing is terminated (YES in the step S209), the process is then terminated.

As described with reference to FIG. 8 and FIG. 9, when the position PS on the projection surface 10 pointed by the first pointer 50 is not included in the drawing area 20, the display 164 projects the area image 21 on the projection surface 10 at the first luminance B1. Further, when the position PS on the projection surface 10 pointed by the first pointer 50 is included in the drawing area 20, the display 164 projects the area image 21 on the projection surface 10 at the fourth luminance B4 higher than the first luminance B1. Therefore, it is possible for the user to visually recognize whether or not the position PS on the projection surface 10 pointed by the first pointer 50 is included in the drawing area 20 based on the luminance of the area image 21. Therefore, it is possible to enhance the convenience of the user.

6. Functions and Advantages

As described hereinabove, the method of controlling the projector 100 according to the present disclosure includes: projecting the achromatic area image 21 representing the drawing area 20 in which the projector 100 receives the drawing with the first pointer 50 on the projection surface 10 at the first luminance B1 at a ratio smaller than or equal to the specific ratio to the maximum luminance at which the projector 100 can project an image 21 on the projection surface 10, detecting the position PS on the projection surface 10 pointed by the first pointer 50 while projecting the area image 21, determining whether or not the position PS is included in the drawing area 20, and displaying the area including at least a part of the outline 210 of the drawing area 20 at a luminance higher than the first luminance B1 using the projector 100 when it has been determined that the position PS is included in the drawing area 20.

As described above, since the area including at least a part of the outline 210 of the drawing area 20 is displayed at a luminance higher than the first luminance B1 of the area image 21 when it has been determined that the position PS is included in the drawing area 20, it is possible for the user to visually recognize whether or not the position PS is included in the drawing area 20. Therefore, it is possible to enhance the convenience of the user.

Further, displaying the area including at least a part of the outline 210 includes displaying the whole of the outline 210 at the second luminance B2 higher than the first luminance B1, and displaying the area image 21 at the first luminance B1 in an inside part of the outline 210.

As described above, since the whole of the outline 210 is displayed at the second luminance B2 higher than the first luminance B1 when it has been determined that the position PS is included in the drawing area 20, it is possible for the user to visually recognize with ease whether or not the position PS is included in the drawing area 20. Further, since the area image 21 at the first luminance B1 is displayed in the inside part of the outline 210, the luminance in the area in which the user performs drawing with the first pointer 50 is kept at the first luminance B1. Therefore, it is possible to suppress the variation in appearance of the character, the figure, and so on which are drawn in the drawing area 20 by the user such as the hand-drawn image 22.

Further, determining whether or not the position PS is included in the drawing area 20 includes determining whether or not the specific area AR having a predetermined shape including the position PS overlaps the outline 210.

Since whether or not the specific area AR having a predetermined shape including the position PS overlaps the outline 210 is determined, by appropriately setting the size of the specific area AR, it becomes possible to inform the user of the fact that the position PS on the projection surface 10 pointed by the first pointer 50 has approached the outline 210.

Further, displaying the area including at least a part of the outline 210 includes displaying the portion 211 of the outline 210 overlapping the specific area AR at the third luminance B3 higher than the first luminance B1.

As described above, when the specific area AR overlaps the outline 210, since the portion 211 of the outline 210 overlapping the specific area AR is displayed at the third luminance B3 higher than the first luminance B1, it is possible for the user to visually recognize the position of the outline 210 in the vicinity of the position PS. Further, since the portion 211 of the outline 210 overlapping the specific area AR is displayed at the third luminance B3 higher than the first luminance B1, it is possible to reduce the variation in appearance of the whole of the image displayed on the projection surface 10. Therefore, it is possible to prevent an uncomfortable feeling from being provided to the user looking at the image displayed on the projection surface 10.

Further, displaying the portion 211 of the outline 210 includes displaying the portion 211 of the outline 210 with a chromatic color.

Since the portion 211 of the outline 210 is displayed with the chromatic color as described above, it is possible to improve the visibility of the position of the outline 210.

Further, displaying the area including at least a part of the outline 210 includes displaying the whole of the drawing area 20 at the fourth luminance B4 higher than the first luminance B1.

Since the whole of the drawing area 20 is displayed at the fourth luminance B4 higher than the first luminance B1 as described above, it is possible for the user to visually recognize with ease whether or not the position PS is included in the drawing area 20.

The projector 100 according to the present embodiment includes the light source 121, the light modulation device 123 which modulates the light from the light source 121 to thereby emit the image light, the imager 135 for generating the taken image for detecting the position PS on the projection surface 10 pointed by the first pointer 50, and the first controller 150 for controlling the light modulation device 123 and the imager 135, wherein the first controller 150 executes the steps of projecting the achromatic area image 21 representing the drawing area 20 in which the drawing with the first pointer 50 is received on the projection surface 10 at the first luminance B1 at a ratio smaller than or equal to the specific ratio to the maximum luminance at which an image 21 can be projected on the projection surface 10, making the imager 135 detect the position PS on the projection surface 10 pointed by the first pointer 50 while projecting the area image 21, determining whether or not the position PS is included in the drawing area 20, and making the light modulation device 123 display the area including at least a part of the outline 210 of the drawing area 20 at a luminance higher than the first luminance B1 when it has been determined that the position PS is included in the drawing area 20.

As described above, since the area including at least a part of the outline 210 of the drawing area 20 is displayed at a luminance higher than the first luminance B1 of the area image 21 when it has been determined that the position PS is included in the drawing area 20, it is possible for the user to visually recognize whether or not the position PS is included in the drawing area 20. Therefore, it is possible to enhance the convenience of the user.

7. Modified Examples

The embodiments described above are preferred embodiments of the present disclosure. It should be noted that the present embodiments are not a limitation, and the present disclosure can be implemented in a variety of modified aspects within the scope or the spirit of the present disclosure.

In the present embodiments, there is described when the pointer is mainly the first pointer 50, but this is not a limitation. The pointer can be the second pointer 70.

In the first embodiment, there is described when the specific area AR has the circular shape, but this is not a limitation. The specific area AR can have, for example, a rectangular shape. Further, the specific area AR can have a polygonal shape. Further, the specific area AR can have an oval shape or an elliptical shape.

It should be noted that when the specific area AR has a circular shape centering on the position PS, it is possible to easily determine whether or not the specific area AR overlaps the outline 210. Specifically, for example, when the distance between the position PS and the outline 210 is no larger than the radius R of the specific area AR, it is possible to determine that the specific area AR overlaps the outline 210. Further, when the distance between the position PS and the outline 210 is larger than the radius R of the specific area AR, it is possible to determine that the specific area AR does not overlap the outline 210.

In the first embodiment, there is described when the portion 211 of the outline 210 overlapping the specific area AR is displayed with a red color, but this is not a limitation. It is sufficient to display the portion 211 of the outline 210 overlapping the specific area AR with a chromatic color. It is possible to display the portion 211 of the outline 210 overlapping the specific area AR with, for example, a green color.

In the present embodiments, there is described the configuration in which the projector 100 is provided with the irradiator 133 and the imager 135, but it is possible to dispose at least one of the irradiator 133 and the imager 135 outside the projector 100 as a separate device. Further, it is possible for a part of the function of the first controller 150 to be installed in the separate device disposed outside the projector 100. When these constituents are disposed outside the projector 100, these constituents can each be an independent device, and it is also possible to adopt a device including two or more of these constituents. Regarding these cases, the whole including the separate configurations can be called a projector.

Further, each of the constituents shown in FIG. 3 is for showing the functional configuration of the first controller 150, and the specific installation aspects are not particularly limited. In other words, it is not necessarily required to install the hardware individually corresponding to each of the constituents, but it is possible to adopt a configuration of realizing the functions of the plurality of constituents by a single processor executing a program. Further, a part of the function realized by software in the present embodiments can also be realized by hardware, or a part of the function realized by hardware can also be realized by software. Besides the above, the specific detailed configuration of other constituents of the projector 100 can arbitrarily be modified within the scope or the spirit thereof.

Further, the processing units of the flowcharts shown in FIG. 7 and FIG. 9 are obtained by dividing the processing of the first controller 150 in accordance with major processing contents in order to make the processing of the first controller 150 easy to understand. The way of division or the names of the processing units shown in each of the flowcharts in FIG. 7 and FIG. 9 is not a limitation, and it is also possible to divide the processing into a larger number of processing units, or it is also possible to divide the processing so that one processing unit includes a larger amount of processing in accordance with the processing contents. Further, the processing sequences of the flowcharts described above are not limited to the illustrated example.

Further, the projection method of the projector 100 can be realized by making the processor 160A provided to the projector 100 execute the control program corresponding to the projection method of the projector 100. Further, it is also possible to record the control program on a recording medium which stores the control program in a computer readable manner. As the recording medium, there can be used a magnetic or optical recording medium, or a semiconductor memory device.

Specifically, there can be cited a portable or rigid recording medium such as a flexible disk, an HDD (Hard Disk Drive), a CD-ROM (Compact Disc Read Only Memory), a DVD (Digital Versatile Disc), a Blu-ray (a registered trademark) disc, a magnetooptic disc, a flash memory, or a card-type recording medium. Further, the recording medium can also be a RAM, or a nonvolatile storage device such as a ROM or the HDD as an internal storage device provided to the projector 100.

Further, it is also possible to realize the projection method of the projector 100 by storing the control program corresponding to the projection method of the projector 100 in a server device or the like in advance, and then downloading the control program from the server device to the projector 100.

What is claimed is:

1. A method of controlling a projector comprising:
projecting an achromatic area image representing a drawing area in which a projector receives drawing using a pointer on a projection surface at a first luminance at a ratio on the projection surface, the ratio being smaller than or equal to a specific ratio to a maximum luminance at which the projector capable of project an image on the projection surface;
detecting a position on the projection surface pointed by the pointer while projecting the area image;
determining whether or not the position is included in the drawing area; and
displaying, by the projector, an area including at least a part of an outline of the drawing area at a luminance higher than the first luminance when it is determined that the position is included in the drawing area.

2. The method of controlling the projector according to claim 1, wherein
the displaying the area including at least a part of the outline includes
displaying a whole of the outline at a second luminance higher than the first luminance, and
displaying the area image at the first luminance in an inside part of the outline.

3. The method of controlling the projector according to claim 1, wherein
the determining includes determining whether or not an area having a shape including the position overlaps the outline.

4. The method of controlling the projector according to claim 3, wherein
the displaying the area including at least a part of the outline includes displaying a portion of the outline overlapping the area having the shape at a third luminance higher than the first luminance.

5. The method of controlling the projector according to claim 4, wherein
the displaying the portion of the outline includes displaying the portion of the outline with a chromatic color.

6. The method of controlling the projector according to claim 1, wherein
the displaying the area including at least a part of the outline includes displaying a whole of the drawing area at a fourth luminance higher than the first luminance.

7. A projector comprising:
a light source;
a detection device configured to detect a position on a projection surface pointed by a pointer; and
at least one processor programmed to execute
projecting, using the light source, an achromatic area image representing a drawing area in which drawing with the pointer is received on a projection surface at a first luminance at a ratio on the projection surface, the ratio being smaller than or equal to a specific ratio to a maximum luminance at which an image is projected on the projection surface,
detecting a position on the projection surface pointed by the pointer using the detection device while projecting the area image,
determining whether or not the position is included in the drawing area, and
displaying, using the light source, an area including at least a part of an outline of the drawing area at a luminance higher than the first luminance when it is determined that the position is included in the drawing area.

* * * * *